United States Patent [19]
Brown

[11] 3,846,012
[45] Nov. 5, 1974

[54] TRANSPARENT FRONT PROJECTION SCREEN HAVING CONCAVE RIDGES THEREON

[75] Inventor: John W. Brown, Flemington, N.J.

[73] Assignee: Qantix Corporation, Flemington, N.J.

[22] Filed: Nov. 14, 1973

[21] Appl. No.: 415,686

[52] U.S. Cl. ............................................. 350/128
[51] Int. Cl. ......................................... G03b 21/60
[58] Field of Search ...................... 350/128; 353/71

[56] References Cited
UNITED STATES PATENTS

| | | | |
|---|---|---|---|
| 2,154,868 | 4/1939 | Saint Genies | 350/128 |
| 2,268,351 | 12/1941 | Tanaka | 350/128 |
| 2,351,034 | 6/1944 | Gabor | 350/128 X |
| 2,567,654 | 9/1951 | Siezen | 350/128 X |

*Primary Examiner*—Richard A. Wintercorn
*Attorney, Agent, or Firm*—Lerner, David, Littenberg & Samuel

[57] ABSTRACT

A front projection screen is disclosed which is made from a transparent material. Optical elements are formed on the back side thereof so that light incident upon the screen from a preferred direction will be totally reflected by the screen while light incident upon the screen from other directions will pass therethrough. Sides of the optical elements are curved to provide dispersion in the horizontal plane while the front surface of the projection screen has segments of cylindrical columns formed thereon perpendicular to the optical elements to provide an angular spread in the vertical plane.

7 Claims, 3 Drawing Figures

PATENTED NOV 5 1974 3,846,012
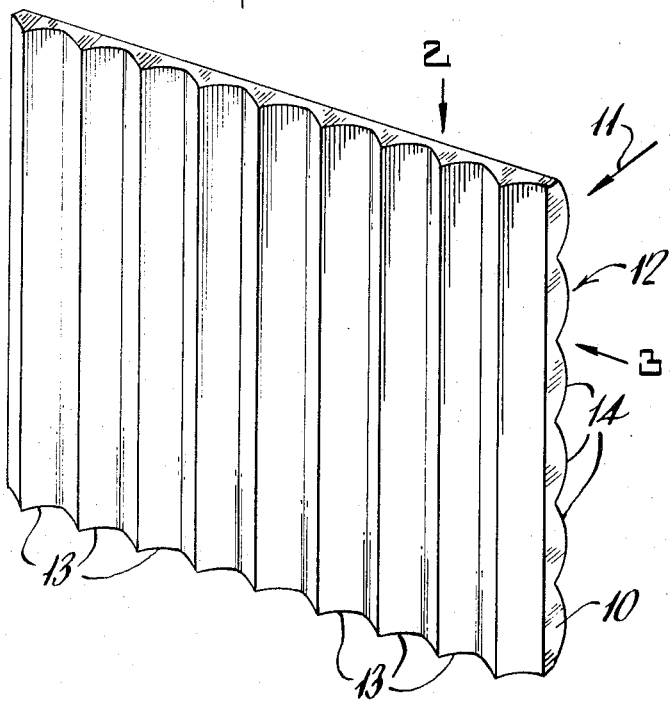
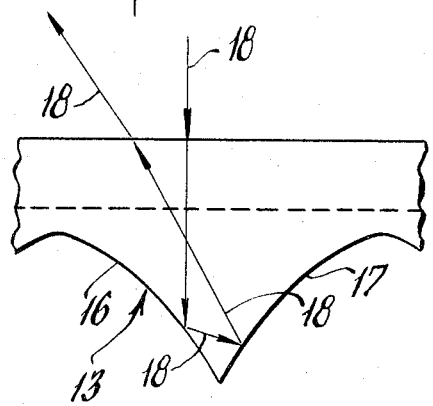
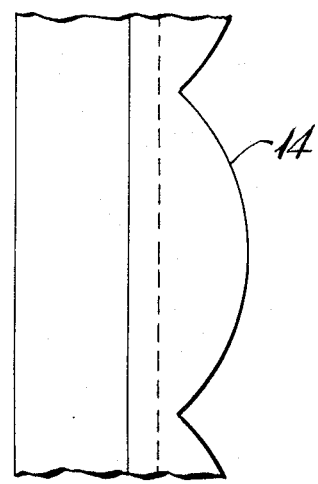

3,846,012

TRANSPARENT FRONT PROJECTION SCREEN HAVING CONCAVE RIDGES THEREON

FIELD OF THE INVENTION

The invention relates to projection screens and particularly to front projection screens.

BACKGROUND OF THE INVENTION

In my U.S. Patent application, Ser. No. 310,882, filed Nov. 30, 1972, entitled FRONT PROJECTION SCREEN MADE FROM A TRANSPARENT MATERIAL, now U.S. Pat. No. 3,782,805, issued Jan. 1, 1974 I disclosed a screen made from a transparent material which could be viewed by a plurality of individuals located within a predetermined arcuate position in relationship thereto. This screen will reflect light from a preferred direction and will pass light therethrough coming from other directions.

In my above-mentioned patent application, I taught that a front projection screen of the above characteristics could be made from a sheet of light transparent material having a predetermined critical angle of internal reflection less than 45° if one placed a plurality of parallel ridges on the back side thereof with each of the ridges having curved sides terminating at a peak wherein the curved sides extended away from the sheet at an angle equal to or greater than 45° immediately adjacent to the sheet and with an angle between a line tangent to the sides and the sheet continuously decreasing as the curved side extended towards the peak. I have now found that a transparent front projection screen can be constructed which can be viewed by an audience dispersed within an angular sector in relationship to the screen employing a construction different than the one taught in my above-mentioned patent application.

BRIEF DESCRIPTION OF THE INVENTION

The present invention contemplates a front projection screen made from a sheet of light transmitting material having a predetermined critical angle of internal reflection less than 45°; the sheet has a front surface and a back surface; the back surface having formed thereon a plurality of parallel ridges; each of the ridges having curved sides terminating at a peak; the curved sides extend away from the sheet at an angle of approximately 45° immediately adjacent to the sheet; the angle between a line tangent to the sides and the sheet continuously increases as the curved sides extend towards the peak.

In the preferred embodiment the angle between the line tangent to the sides and the sheet is approximately equal to 60° minus one-third of the predetermined critical angle of internal reflection at the peaks.

DESCRIPTION OF THE DRAWINGS

For more complete understanding of the invention, reference should be made to the following detailed description and drawings in which:

FIG. 1 is a back perspective view of a screen constructed in accordance with the teachings of this invention;

FIG. 2 is a portion of a sectional view of the screen of FIG. 1 taken along the line 2—2 to show one ridge on the back thereof and light interacting therewith;

FIG. 3 is a portion of a sectional view of the screen shown in FIG. 1 taken along the line 3—3 to show ridge on the front thereof.

DETAILED DESCRIPTION OF THE INVENTION

Referring now to FIG. 1, we see a front projection screen, 10, constructed in accordance with the teachings of this invention. A light ray, 11, is shown projecting towards a front surface, 12, of the screen, 10, from a projection (not shown) mounted a fixed distance therefrom. The screen, 10, can be formed as a section of a sphere having a radius of curvature equal to the distance between the screen, 10, and the projector (not shown). It is of course understood that as the distance between the projector and the screen, 10, becomes greater, the need for the precise curvature of the screen, 10, becomes less critical so as the distance becomes substantial the screen, 10, may be in fact flat. It is of course understood that the reason for the curvature of the screen, 10, is to ensure that the rays of light such as ray, 11, eminating from the projector incident upon the screen, 10, strike the front surface, 12, thereof, normal thereto at each point thereof.

The screen, 10, is made from a transparent material which has a critical angle of internal reflection less than 45°. A critical angle of internal reflection is defined as the angle at which light must strike a surface of a material when passing from the inside to the outside thereof to a second predetermined medium so as to be totally reflected rather than passing to the second medium. The angle of incidence as referred to above is measured between the ray of light and a line normal to the surface of interest at the point of incidence. The critical angle of internal reflection is the angle which defines the limit of total reflection so any incident light beam which has an angle of incidence greater than a critical angle will be totally reflected.

As can be seen from looking at FIG. 1 the back surface of the screen, 10, has a plurality of ridges, 13, thereon. Referring to FIG. 2 we can see the precise shape of one of the ridges, 13. It should, of course, be understood that all of the ridges, 13, have the same shape.

Referring again to FIG. 1, we can see that the front surface, 12, of the screen, 10, has a plurality of ridges, 14, thereon which are at right angles to the ridges, 13. The shape of one of the ridges, 14, (which is identical to all the others) is shown in FIG. 3. From looking at FIGS. 1 and 3 we can see that the front ridges each form a section of a cylinder.

The ridges, 14, (in this particular instance) each forms a surface of 30° of a cylinder. These ridges, 14, act as optical elements for operating on the incoming light from the projector for purpose of creating dispersion of the light to a predetermined range of areas in front of the screen, 10, in the vertical plane.

For a more complete understanding of the ridges, 14, reference should be made to my co-pending U.S. patent application, Ser. No. 310,882 filed Nov. 30, 1972 entitled FRONT PROJECTION SCREEN MADE FROM A TRANSPARENT MATERIAL, now U.S. Pat. No. 3,782,805, which is incorporated herein by reference.

In distinction to the screen disclosed in my above-mentioned patent application, the sides of the ridges, 13, in the present invention are concave rather than convex. Therefore, it can be seen, from looking at FIG.

2, the ridges, 13, each have two sides, 16 and 17. Each of the sides extend away from the back surface of the screen, 10, at an angle of approximately 45°. The curvature of the sides 16 and 17 is convex so that the angle between the line tangent to the sides 16 and 17 and the sheet of material from which the screen, 10, is formed increases as the sides 16 and 17 extend towards the peak. It has been found that with such a curvature, with the proper material, a useful screen can be made.

With the ridges, 13, as shown in FIGS. 1 and 2 a light ray such as light ray, 18, when striking the curved side, 16, will be projected backwards away from the screen, 10, rather than parallel thereto or towards the screen, 10. When the light ray strikes the side, 17, it must still have an angle of incidence which is less than the critical angle of internal reflection in order to be projected as shown rather than passing through the screen. It has been found that when the angle between a tangent to the sides 16 and 17 and a plane lying in the sheet which form the screen, 10, is less than 60° minus one-third of the predetermined critical angle of internal reflection, an incidence light ray such as light ray, 18, will be reflected rather than passing through Therefore, to optimize a screen having concave ridges. such as ridges 13, it has been found that the angle between a line tangent to the sides 16 and 17 and the sheet could be approximately equal to 60° minus one-third of the predetermined critical angle of internal reflection at the peaks.

One material which has been found which will make a useful screen in accordance with the teachings of this invention, is flint glass. Flint glass can be obtained with an index of refraction of 1.9. In such a case the critical angle would be 32°. In such a situation the angle between the tangent to the sides 16 and 17 at the jucture thereof which is the peak of the ridge, 13, and the plane of the sheet which forms the screen, 10, would be 49⅓°.

It should be understood that while this invention has been described with respect to a particular embodiment thereof numerous others will become obvious to those of ordinary skill in the art in light thereof.

What is claimed is:

1. A front projection screen made from a sheet of light transmitting material having a predetermined critical angle of internal reflection less than 45°; said sheet having a front surface and a back surface; said screen being characterized by:

said back surface having formed thereon a plurality of parallel ridges; each of said ridges having curved sides terminating at a peak; said curved sides extending away from said sheet at an angle of approximately 45° immediately adjacent to said sheet; the angle between a line tangent to said sides and said sheet continuously increasing as said curved sides extend towards said peak.

2. The front projection screen as defined in claim 1 characterized further by:

said front surface having formed thereon a plurality of parallel ridges each forming a section of a cylinder; said ridges on said front surface being dispositioned perpendicularly to said ridges on said back surface.

3. The front projection screen as defined in claim 1 in which said angle between a line tangent to said sides and said sheet is approximately equal to 60° minus one third said predetermined critical angle of internal reflection at said peaks.

4. The front projection screen as defined in claim 3 characterized further by:

said front surface having formed thereon a plurality of parallel ridges each forming a section of a cylinder; said ridges on said front surface being dispositioned perpendicularly to said ridges on said back surface.

5. The combination as defined in claim 4 in which said front surface has a minimum of 500 ridges thereon.

6. The combination as defined in claim 5 in which said back surface has a minimum of 500 ridges thereon.

7. The combination as defined in claim 6 in which said light transmitting material is flint glass.

* * * * *